W. A. KRUTH.
MILK BOTTLE HANDLE.
APPLICATION FILED FEB. 2, 1920.
1,351,479.
Patented Aug. 31, 1920.
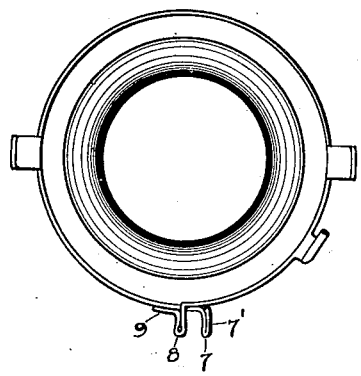
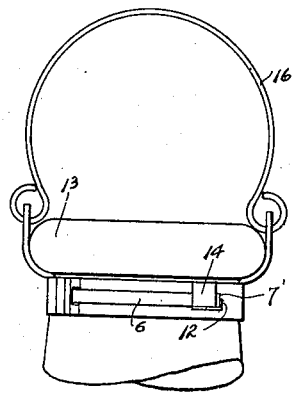
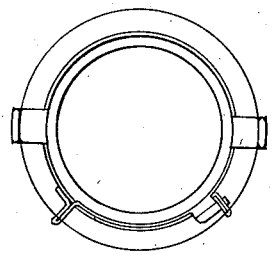
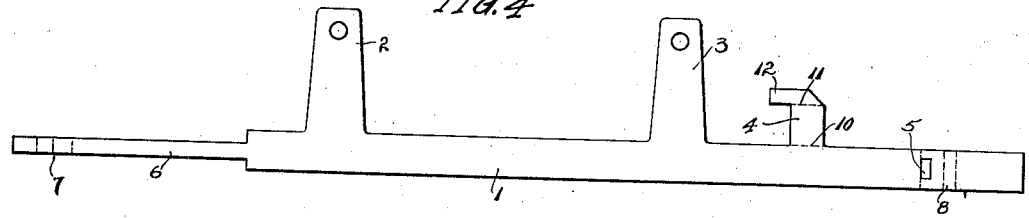
INVENTOR
WILLIAM A KRUTH
By C. D. Enschede
ATTORNEY

UNITED STATES PATENT OFFICE.

WILLIAM A. KRUTH, OF MINNEAPOLIS, MINNESOTA.

MILK-BOTTLE HANDLE.

1,351,479.  Specification of Letters Patent.  Patented Aug. 31, 1920.

Application filed February 2, 1920. Serial No. 355,799.

*To all whom it may concern:*

Be it known that I, WILLIAM A. KRUTH, a citizen of the United States, and a resident of Minneapolis, in the county of Hennepin and State of Minnesota, have invented certain new and useful Improvements in Milk-Bottle Handles, of which the following is a specification.

One object of my invention is to provide a milk bottle handle easily and securely attached to a milk bottle of the ordinary style.

Another object is to provide a construction for a milk bottle handle that can be economically formed.

With these and incidental objects in view, the invention consists of certain novel features of construction and combination of parts, the essential elements of which are hereinafter described with reference to the drawing which accompanies and forms a part of this specification.

In the drawing, Figure 1 is a side elevation of a fragment of a milk bottle top, showing my improved handle applied thereto; Fig. 2 is a plan view of the same with the bail of the handle removed; Fig. 3 is a similar view but with the band of the handle opened so the handle may be readily removed from the milk bottle; and Fig. 4 is a side elevation of the blank from which the band of the handle is formed.

As shown in Fig. 4, the strip 1 of the band has bail ears 2 and 3 extending upwardly therefrom, and has a lip 4 from which the catch 14, Fig. 1, is formed, extending parallel to the bail ears.

The aperture 5 is punched out of the strip so the tongue 6 may be passed therethrough. The tongue 6 is doubled onto itself at 7 and then formed into an L-shaped latch 7', as better shown in Fig. 3.

The band is doubled on itself at 8, Figs. 2 and 3, the latch 7' passing through the aperture 5 and under the portion 9 of the band, as plainly shown in Fig. 3.

The lip 4 is bent downward at 10, Fig. 4, to form part of the catch 14 for the latch 7' and the lower portion of the lip after it is so formed is bent outward along the line 11, the lip 12 being then bent upward to form a catch for the outward projecting portion of the latch 7'.

When the band is spread as shown in Fig. 3, it may be readily passed over the bead 13 on the top of ordinary milk bottles and contracted below this bead, as shown in Fig. 1, the tongue 6 being passed under the catch 14 and the latch 7' dropping in behind the formed lip 12, so the band is locked to the neck of the bottle and when the bottle is lifted by the bail 16 there is no possibility of the band becoming loosened from the bottle.

While I have described my invention and illustrated it in one particular design, I do not wish it understood that I limit myself to this construction, as it is evident that the application of the invention may be varied in many ways within the scope of the following claims.

Claims:

1. In a milk bottle handle the combination of a band having one end thereof formed into a tongue, an aperture in the other end of said band to form a guide for said tongue when passed therethrough, the portion of said band beyond said aperture being folded against itself and extending outwardly from said band, a latch formed from an ear extending from said band and positioned adjacent to said aperture and a latch formed at the extremity of said tongue to coöperate with said catch, said band being formed into a circular shape and adapted to be passed around the throat of a milk bottle and held in positive relation thereto by the coöperation of said latch and catch, and lifting means extending from said band.

2. As an article of manufacture a milk bottle handle band comprising a strip portion having a reduced tongue portion at one end thereof, an aperture near the opposite end thereof, a portion of said tongue being doubled back on itself and the double thickness so reduced being bent outwardly at substantially right angles to said tongue, two ears projecting from said band and having apertures therein for the attachment thereto of a bail, a third ear extending from said band, of general L-shape, said last named ear being formed downwardly into a position parallel with said strip portion and the lower portion of said lip, after said formation, being then bent outwardly at substantially right angles to said strip, the L-shaped arm of said ear being then formed upwardly to serve as a catch for the formed portion of said tongue when passed through said aperture.

WILLIAM A. KRUTH.